United States Patent [19]

Lund

[11] Patent Number: 5,735,652
[45] Date of Patent: Apr. 7, 1998

[54] BROACHING CUTTER

[75] Inventor: David R. Lund, Charleston, S.C.

[73] Assignee: Victory in Jesus Ministries, Summerville, S.C.

[21] Appl. No.: 505,570

[22] Filed: Jul. 21, 1995

[51] Int. Cl.$^6$ .................. B23D 9/00; B23B 41/04
[52] U.S. Cl. ............................. 409/288; 82/1.3
[58] Field of Search .................. 409/282, 281, 409/280, 288, 316, 317, 318, 319; 408/150, 151, 173, 25, 26, 30; 82/1.3

[56] References Cited

U.S. PATENT DOCUMENTS

| | | | |
|---|---|---|---|
| 1,356,571 | 10/1920 | Ungerman | 82/1.3 |
| 1,424,535 | 8/1922 | Watts | 82/1.3 |
| 1,540,826 | 6/1925 | Watts | 82/1.3 |
| 2,661,640 | 12/1953 | Rüegg | 82/1.3 |
| 3,059,508 | 10/1962 | Staats et al. | 82/1.3 |
| 3,715,644 | 2/1973 | Bobrowicz et al. | 318/573 |
| 3,720,989 | 3/1973 | Ramond | 29/159 |
| 3,842,546 | 10/1974 | Ramond | 51/288 |
| 4,423,989 | 1/1984 | Kress et al. | 408/197 |
| 4,449,432 | 5/1984 | Smith | 82/3 |
| 4,462,723 | 7/1984 | Walter et al. | 407/18 |
| 5,542,324 | 8/1996 | Hormannsdorfer | 82/1.3 |

FOREIGN PATENT DOCUMENTS 3042123  6/1982  Germany ................... 82/1.3

Primary Examiner—William R. Briggs
Attorney, Agent, or Firm—B. Craig Killough

[57] ABSTRACT

A broaching cutter comprises a first shaft coupled to a cutter bit-carrying second shaft in such a way that the second shaft rotates when the first shaft rotates and is also radially displaceable with respect to the first shaft so that the second shaft revolves about the axis of the first shaft in a preselected pattern. A rotor on the end of the first shaft carries a connector in a slot in such a way that the connector is free to slide within the slot. The connector is attached to the second shaft and to a cam follower. As the connector slides, it displaces the second shaft radially with respect to the axis of rotation. The first shaft rotated within a stationary holder that has a cam race encircling the first shaft. The cam follower follows the cam race in the stationary holder, thereby varying the radial displacement of the connector. Thus, square, hexagonal or other shaped holes can be formed in a workpiece depending on the shape of the cam race.

16 Claims, 4 Drawing Sheets

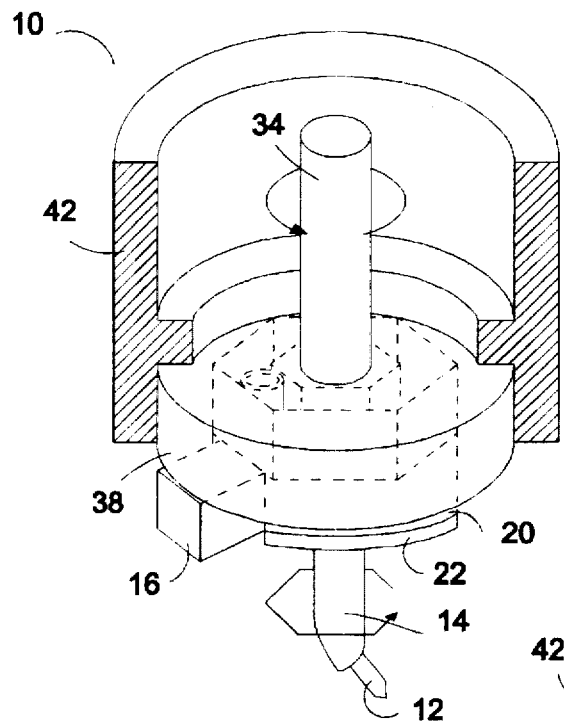
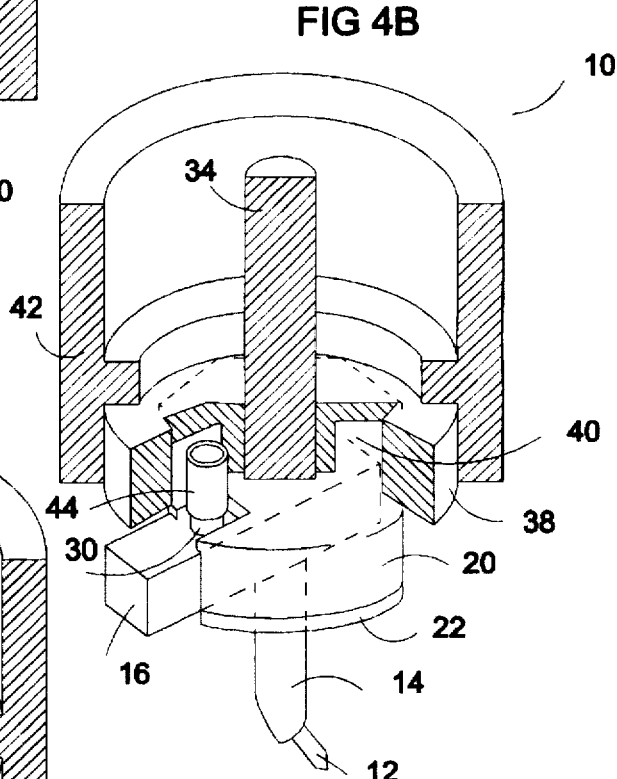
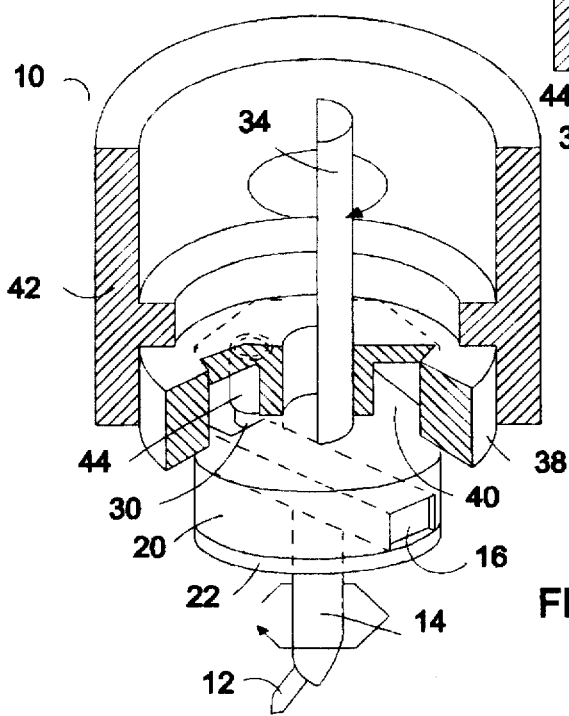

BROACHING CUTTER

BACKGROUND OF THE INVENTION

1. Field of the Invention

The present invention relates to cutting and milling tools. In particular, it relates to broaching cutters.

2. Discussion of Background

It is sometimes desirable to form a hole in wood or metal that is not a round hole but is square or hexagonal. The process for making such a hole is called "broaching" and is much more complicated than the process for making a round hole. Initially, a round (or cylindrical) hole is made in a workpiece. Then the inside surface of the cylindrical hole is modified to make it square, hexagonal or some other shape.

In making a hole in a workpiece with a cutting tool such as a drill, the cutting tool can rotate about an axis. Thus, cylindrical holes are relatively easy to make, with the radius of the hole being simply a function of how far the cutting bit's edge is from the axis of rotation of the shaft to which it is attached. When a square or hexagonal hole is to be formed, on the other hand, the motion of the cutter must depart from simple rotational motion. As soon as the motion of a tool is no longer purely rotational, however, the impact on the workpiece from the broaching process goes beyond simply the formation of the desired square or hexagonal hole. In particular, tolerances can be adversely affected, the time required for broaching may add significantly to the cost of making the finished part, and additional machinery will be required.

Typical broaching machinery costs from $25,000 on up to several hundred thousand dollars. The cutters of these tools tend to also be expensive and to wear quickly and to have short lifetimes notwithstanding frequent resharpening. Broaching a workpiece that is within tolerances can distort the workpiece so that further work must be done to bring it back within tolerances.

However, square or hexagonal holes have advantages in joining parts. Joints of hexagonal shafts to parts with hexagonal holes do not twist as do round shafts in round holes. The joints are stronger. Therefore, there remains a need for a broaching cutter that performs standard and non-standard broaching simply, cheaply and efficiently.

SUMMARY OF THE INVENTION

According to its major aspects and briefly stated, the present invention is a broaching cutter. The cutter may be configured to fasten to any number of standard machines that can rotate and advance a shaft, such as a drill press, milling machine, electric hand drill, or lathe, or the present invention may be a machine in its own right, to include a motor to rotate the shaft and move it axially with respect to the workpiece. The present invention uses a cutter bit to operate on the inside surface of a cylindrical hole formed in the workpiece, cutting a new surface of the preferred shape and size. The cutter includes a holder with a hole formed in it and with a first shaft fitted through the hole. Around the hole in the holder is a cam race that will dictate the motion of a cutter bit. A rotor is mounted to the end of the first shaft, and a slot formed in the rotor. Within the slot is a connector that can slide freely in a direction perpendicular to the axis of rotation but which is also constrained by the sides of the slot to rotate with the rotor. A second shaft and cutter bit are attached to the connector, along with a cam follower for following the cam race of the holder as the connector rotates. The rotor couples the rotational motion of the first shaft to the second shaft. When the connector slides within its slot, it displaces the second shaft with respect to the axis of the first shaft while rotating about the same axis of rotation as the first shaft. The cam follower, following the cam race, causes the connector to slide within the slot of the rotor and to thereby vary the radial displacement of the second shaft with respect to the axis of the first. The second shaft, then, rotates about and also revolves around the axis of rotation of the first shaft while the bit it carries cuts a pattern in the workpiece as dictated by the cam race.

In a second embodiment, the workpiece and holder rotate and the shaft carrying the cutter bit remains stationery. In this second embodiment, the shaft is hollow and carries the cutter bit within it on the end of a pivoting member. As the cam follower follows a cam race in the rotating holder, the pivoting member, connected to the cam follower by a connector, pivots in response to lateral movement of the cam follower and moves a cutter bit on the other end of the pivoting member through a slot formed in the hollow shaft and into engagement with the workpiece.

It will be clear that a square cam race will produce a square hole, a hexagonal race will produce a hexagonal hole and so forth. It will also be apparent that the shape of the hole does not have to be symmetric. Furthermore, if the shaft rotates less than 360° in one direction and then reverses direction, holes of various asymmetric shapes can be cut. Finally, the cross section of a hole boring does not have to be uniform; a first part of it can be cylindrical, then a next part can be square and then a third part cylindrical again, simply by substituting the cutter according to the present invention at the appropriate part of the boring.

A feature of the present invention is use of a cam race and cam follower to broach the hole. By changing the shape of the race, a wide variety of hole shapes and sizes can be broached in a workpiece. Furthermore, broaching operations currently not considered economically feasible are now possible.

Another important feature of the present invention is the coupling of rotational motion and revolutionary motion in the second shaft using the rotor and connector. The advantage of this feature is that it enables use of a cam follower and cam race for determining the pattern of the cutter.

Still another important feature of the present invention is that it requires only rotating a shaft with respect to a holder to drive the cutter bit as described. This feature enables a wide variety of machines to be adaptable for using the present device.

Because of the simplicity of the present broaching apparatus, the broaching process can be done two orders of magnitude cheaper and in roughly the same time as with conventional broaching machines. Tolerances are essentially unaffected, and cutter bits last longer and do not wear as quickly.

Other features and their advantages will be apparent to those skilled in the art from a careful reading of the Detailed Description of Preferred Embodiments accompanied by the Drawings.

BRIEF DESCRIPTION OF THE DRAWINGS

In the drawings,

FIGS. 4a, 4b and 4c show perspective views of an assembled broaching cutter in three different stages of rotation, according to a preferred embodiment of the present invention, with portions of FIGS. 4b and 4c cut away;

DETAILED DESCRIPTION OF PREFERRED EMBODIMENTS

The present invention is a broaching cutter, that is, a device for cutting non-cylindrical holes into a material. Typically, broaching cutters are used for cutting square or hexagonal holes in workpieces that are made of structural materials such as wood or metal. In order to form a square hole in a workpiece, a cylindrical hole is initially formed in the workpiece and then its interior surface is broached to produce the desired, final, square shape. A device according to the present invention is intended to be used with a variety of standard metal-working or wood shop machines such as drill presses, milling machines and lathes or any other device capable of turning and advancing a shaft. An apparatus according to the present invention may take the form of a complete machine wherein certain components, as will be described presently, may be substituted for broaching holes of different shapes and sizes and where the machine rotates and advances the broaching bit.

Figure 1:
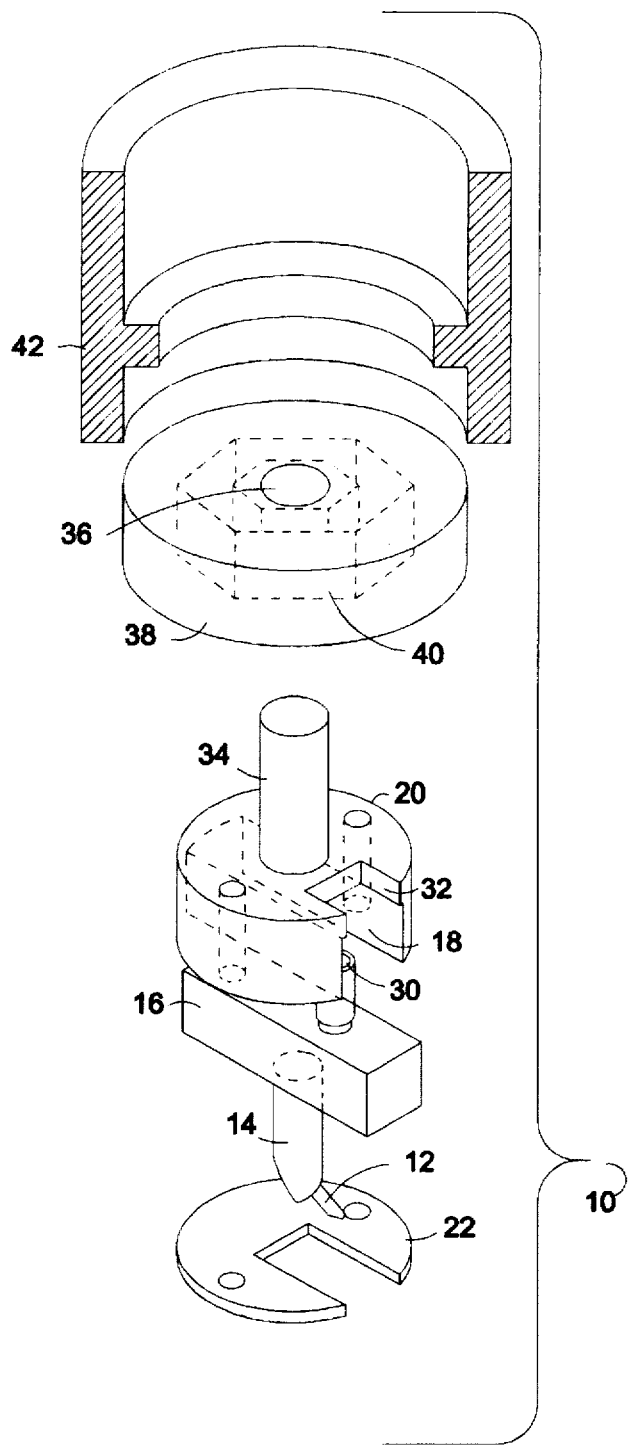
FIG. 1 is an exploded view of a broaching cutter according to a preferred embodiment of the present invention.

Turning now to the drawings, there is illustrated a broaching cutter in FIGS. 1 and 4 according to a preferred embodiment of the present invention, and generally indicated by the reference numeral 10. FIG. 1 shows an exploded perspective view of cutter 10 and FIGS. 4a, 4b, and 4c illustrate an assembled view in three orientations so that relative movement of its components can be easily seen.

Cutter 10 includes a cutter bit 12 that engages a workpiece and will cut away unwanted parts of the material of which the workpiece is made. Cutter bit 12 is held by a cutter shaft 14 firmly so that when cutter shaft 14 rotates, cutter bit 12, generally held at right angles with respect to the axis of cutter shaft 14, rotates with it. Cutter bit 12 is preferably carried in a hole formed at the end of cutter shaft 14 and held in place by a set screw so that the position of cutter bit 12 can be easily adjusted by loosening the set screw and moving cutter bit 12 with respect to cutter shaft 14.

Cutter shaft 14 is carded by a sliding connector 16 that is received in a slot 18 formed in a rotor 20. Connector 16 is held in place in slot 18 by rotor cover plate 22 but is free to slide in slot 18 of rotor 20 in a direction perpendicular to the axis of rotor 20. When connector 16 slides, cutter bit 12 and cutter shaft 14 slide with it and are thereby displaced radially with respect to the common axis of rotor 20 and shaft 14. Also carried by connector 16 is a cam follower 30, which is oriented off center of connector 16 and which extends upward through a cutout portion 32 of rotor 20.

Rotor 20 is attached to the end of a rotor shaft 34 that is turned by a motor (not shown) that can be selected from any shaft-rotating means including the chuck of an electric drill, a milling machine, a drill press and a lathe. The motor must be capable of moving rotor shaft 34 axially toward and away from the workpiece so that cutter bit 12 can be moved into the workpiece as it broaches and removed from the workpiece after the broaching is complete. Both the means for rotating shaft 34 and moving it axially are not shown in FIGS. 1 and 4a, 4b, and 4c for simplicity.

When shaft 34 rotates rotor 20, connector 16, cutter shaft 14 and cam follower 30 are rotated. Shaft 34 extends upwards through a hole 36 formed in a holder 38 that has a cam race 40 formed therein. A cam race is a groove-like path formed in an object; a cam follower "follows" the cam race when it is inserted in the path and engages the sides of the cam race formed in the object. As the cam follower moves, the cam race guides it and controls its motion. In the present invention, cam follower 30 extends through cutout portion 32 above rotor 20 and into cam race 40 of holder 38. Holder 38 is firmly secured to housing 42, preferably by set screws (not shown) or by some other convenient securing means. As shaft 34 rotates rotor 20 and connector 16, cam follower 30 revolves around shaft 34 and follows cam race 40 which governs and controls the movement of cam follower 30. In particular, cam race 40 causes cam follower 30 to vary its radial displacement with respect to the axis of shaft 34. Where cam race 40 causes cam follower 30 to increase its radial displacement, cam follower 30 moves farther from shaft 34; where cam race 40 causes cam follower 30 to decrease its radial distance, cam follower 30 moves closer to shaft 34. As cam follower 30 is radially displaced, it will be clear that connector 16, to which cam follower 30 is attached will slide in slot 18 of rotor 20 and cause cutter shaft 14 and cutter bit 12 to also be radially displaced with respect to the axis of rotation. For ease of movement of cam follower 30 in cam race 40, a cam follower roller 44 can be used. Roller 44 is a cylinder that revolves freely on the outside of cam follower 30 to minimize friction against the walls of cam race 40. Alternatively, a low-friction sleeve can be applied over cam follower 30.

Thus, when the first shaft, namely rotor shaft 34, rotates, it is coupled by rotor 20 to the second shaft, namely cutter shaft 14, so that cutter shaft 14 rotates as well. Simultaneously, the radial displacement of cutter bit 12 with respect to its axis of rotation is controlled by holder 38 using its cam race 40 to govern the movement of cam follower 30 and thus connector 16. The revolving of cutter bit 12 about its own axis of rotation, which is the same as that of shaft 34, follows the pattern dictated by cam race 40 of holder 38.

Figure 2:
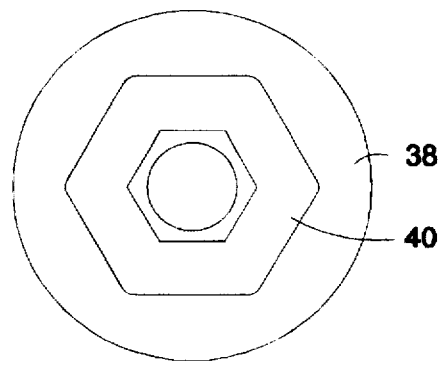
FIG. 2 is a bottom view of a holder with an hexagonal cam race according to a preferred embodiment of the present invention.
Figure 3:
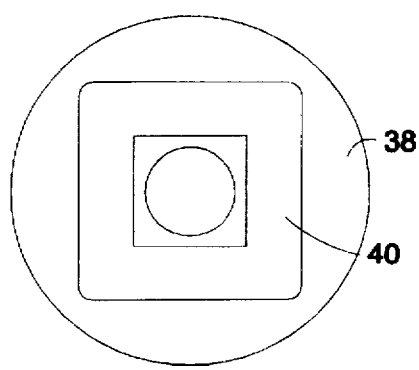
FIG. 3 is a bottom view of an alternative holder with a square cam race according to a preferred embodiment of the present invention.

The pattern of the cut corresponds to the pattern of cam race 40. FIGS. 2 and 3 illustrate two common patterns for cuts, a hexagonal pattern in FIG. 2 and a square pattern in FIG. 3. It will be clear that additional patterns having radial variations are possible, including other polygons, both regular and irregular, star shapes and oval shapes. Furthermore, if shaft 34 is not continuously rotated a full 360°, the pattern does not have to be a closed pattern, that is, one that does not end until it reaches its beginning and then repeats and does not backtrack.

The relative motion of the components of the present apparatus is best seen by comparing FIGS. 4a, 4b and 4c. In FIG. 4a housing 42 grips holder 38; neither rotates with respect to each other. The rotation of shaft 34 is indicated by the arrow. The circular rotation of shaft 34 is coupled to cutter shaft 14 through rotor 20. Although shaft 14 also rotates about the axis of shaft 34, the nature of the motion of shaft 14 is altered by varying its radial displacement so that it also revolves around the axis of shaft 34. Its motion follows the pattern dictated by cam race 40, which in this example is a hexagonal path as indicated by the arrow about shaft 14. It will be clear that, as shaft 34 is advanced axially toward a workpiece, the hexagonal path of cutter shaft 14 and cutter bit 12 will become a hexagonal helical path, resulting in the cutting of a hexagonal hole in the workpiece.

FIGS. 4b and 4c illustrate the relative movement of rotor shaft 34, cutter shaft 14, cutter bit 12, rotor 20, connector 16, cam follower 30, holder 38 and housing 42. Note that cutter bit 12, cutter shaft 16, cam follower 30, and shaft 34 rotate approximately a quarter turn between FIGS. 4b and 4c. However, housing 42, and holder 38 do not rotate but remain fixed. Connector 18 rotates with rotor 20 but it is displaced radially inward as shaft 34 makes the quarter turn from FIG. 4b to FIG. 4c, initially extending slightly beyond the end of slot 18 of rotor in FIG. 4b, and then retreating back into slot 18 in FIG. 4c. The sliding movement of connector 18 is imposed on it by the movement of cam follower 30 as it follows cam race 40.

Figure 5:
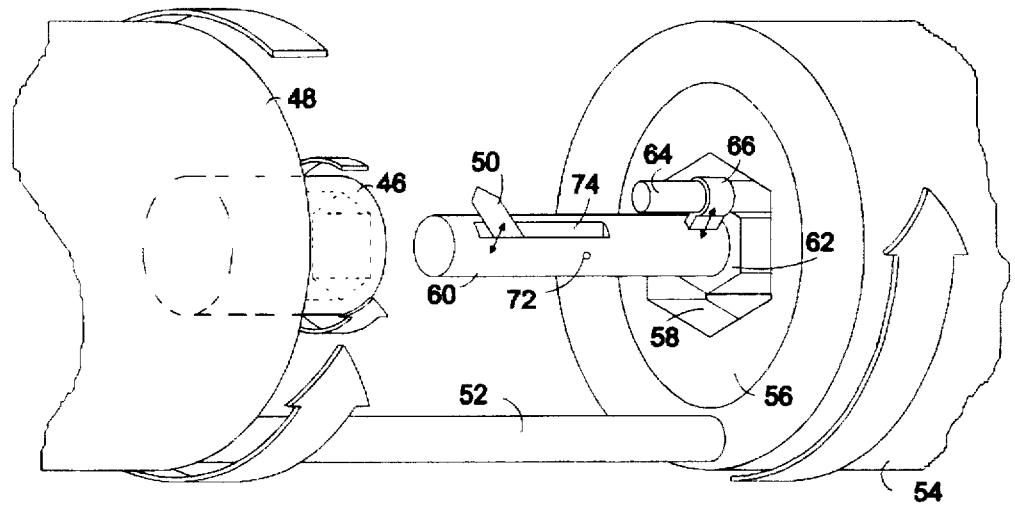
FIG. 5 shows a perspective view of a broaching cutter according to another preferred embodiment of the present invention.
Figure 6:
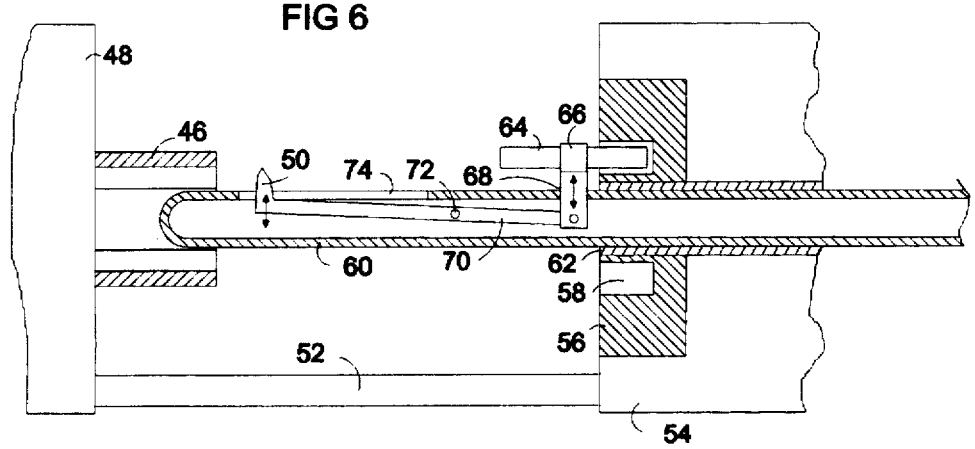
FIG. 6 shows a side cross sectional view of the broaching cutter of FIG. 5.

An alternative preferred embodiment of the present invention is illustrated in FIGS. 5 and 6. This embodiment is suitable for use with a lathe where a workpiece 46 is rotated by a chuck 48 and where broaching cutter bit 50 is held stationary. In a lathe where workpiece 46 would be rotated, a driver shaft 52 mounted radially apart from the axis of rotating workpiece 46 drives a housing 54 that holds a holder 56. Holder 56 rotates with workpiece 46 about an axis of rotation, the same axis about which the workpiece 46 rotates. A cam race 58 is formed in holder 56. A hollow shaft 60 extends through a hole 62 in holder 56 and is held stationary with respect to workpiece 46 and holder 56. While a cam follower 64 follows a rotating cam race 58, it is also secured to a connector 66 that is free to slide in and out of a slot 68 in shaft 60. To connect the motion of connector 66 to a cutter bit, a pivot member 70 (FIG. 6) is pivotally connected to connector 66 on one end and cutter bit 50 is connected to the other end. Pivot member 70 is held in place inside hollow shaft 60 by a pivot pin 72. As connector 66 slides in and out of slot 68, it pivots pivot member 70 about pivot pin 72 to move cutter bit 50 in and out of a second slot 74 formed in shaft 60. As cutter bit is advanced on workpiece 46 held in chuck 48, the hole is formed.

Figure 7:
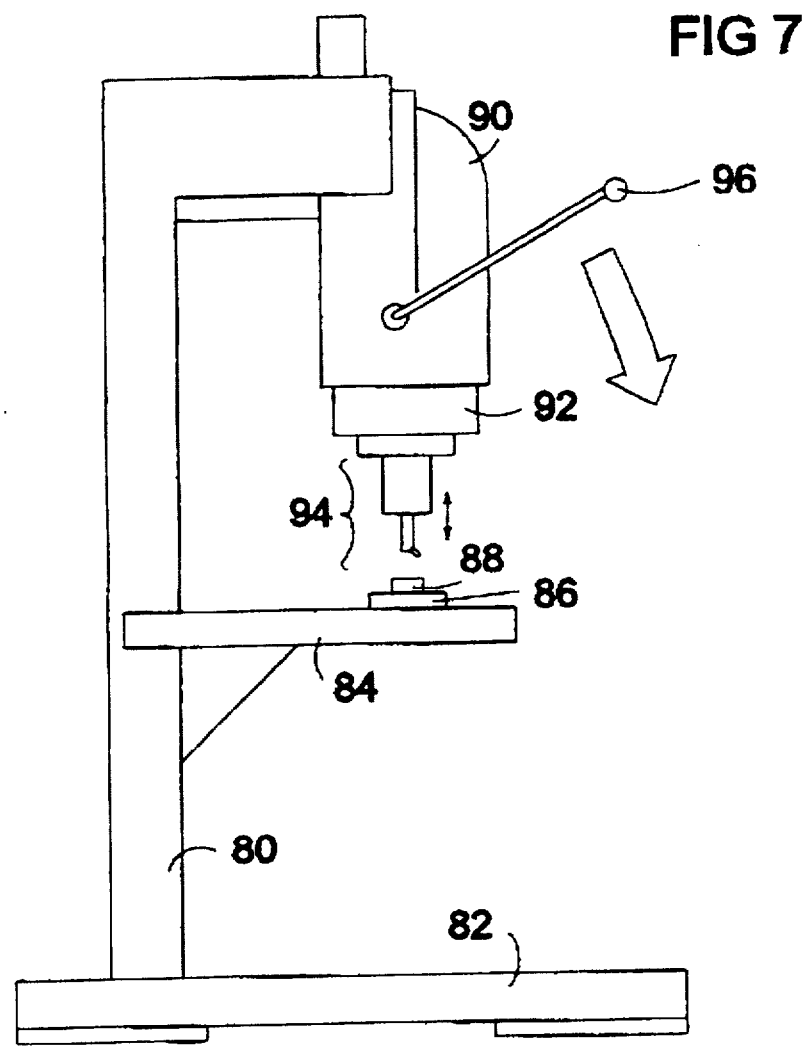
FIG. 7 illustrates a machine according to a preferred embodiment of the present invention.

In FIG. 7, there is shown an embodiment of the present apparatus as a complete machine having a frame 80 supported by a base 82. Frame 80 supports a work platform 84 on which is fastened a fixture 86 that holds a workpiece 88. Frame 80 also supports a motor 90 and housing 92 that holds a device 94 as described with respect to FIGS. 1 and 4a, 4b, and 4c. A handle 96 when operated by the user advances device 94 toward and away from workpiece 88 while motor 90 rotates device 94.

It will be apparent to those skilled in the art that many modifications and substitutions can be made to the foregoing preferred embodiments without departing from the spirit and scope of the present invention as defined by the appended claims.

What is claimed is:

1. A device for broaching a workpiece, comprising:

a first shaft having a first axis of rotation;

a second shaft having a second axis of rotation;

a cutter bit carried by said second shaft;

a rotor attached to said first shaft and rotatable therewith, said second shaft being in operational connection with said rotor; and means for varying a radial displacement of said second shaft with respect to said first shaft as said first shaft rotates with respect to a workpiece so that said cutter bit revolves around said first axis and can broach said workpiece when said cutter bit is brought into engagement with said workpiece, wherein said means for varying a radial displacement of said second shaft comprises:

a holder having a cam race formed therein;

a cam follower engaging said holder so that said cam follower follows said cam race when said second shaft revolves around said first axis; and a connector carried by said rotor and attached to said cam follower, said connector rotatable with said rotor and said first shaft, said cam follower rotating with said connector.

2. The device as recited in claim 1, wherein said connector is slidably carried by said rotor and attached to said cam follower so that, when said connector slides with respect to said rotor, said cam follower slides with respect to said rotor, said cam follower being thereby radially displaceable with respect to said first axis as said cam follower rotates with said connector and said rotor.

3. A device for broaching a workpiece, comprising:

a first shaft having a first axis of rotation;

a second shaft having a second axis of rotation;

a cutter bit carried by said second shaft;

a rotor attached to said first shaft and rotatable therewith, said second shaft being in operational connection with said rotor; and means for varying a radial displacement of said second shaft with respect to said first shaft as said first shaft rotates with respect to a workpiece so that said cutter bit revolves around said first axis and can broach said workpiece when said cutter bit is brought into engagement with said workpiece, wherein said means for varying a radial displacement of said second shaft comprises:

a holder having a through hole and a cam race formed in said holder about said through hole, said first shaft running through said through hole and rotatable with respect to said holder;

a cam follower engaging said holder so that said cam follower revolves around said first shaft; and a connector slidably carried by said rotor and attached to said cam follower so that, when said connector slides with respect to said rotor, said cam follower slides with respect to said rotor, said cam follower being thereby radially displaceable as it follows said cam race and rotates with said connector and said rotor, said second shaft being attached to said connector and rotatable therewith.

4. A device for broaching a workpiece, said device comprising:

a first shaft having a first axis of rotation;

a shaft having a second axis of rotation;

a cutter bit carried by said second shaft;

a rotor which is connected to said first shaft, said rotor having a groove therein;

a connector which is slidably positioned within said groove of said rotor and which is connected to said second shaft so that, when said first shaft rotates with respect to said workpiece, said second shaft and said cutter bit rotate with said rotor, and so that, when said connector slides with respect to said rotor, said second shaft is radially displaced with respect to said first axis; and means for sliding said connector with respect to said rotor so that as said first shaft rotates with respect to said workpiece, said cutter bit carried by said second shaft revolves around said first axis to broach said workpiece.

5. The device as recited in claim 4, wherein said second shaft has a hole formed therein and said cutter bit is received by said second shaft within said hole so that said cutter bit protrudes from said second shaft by a distance, said second shaft including means for adjusting said distance.

6. The device as recited in claim 4, wherein said means for sliding said connector with respect to said rotor further comprises:

a holder having a cam race formed therein;

a cam follower engaging said holder so that said cam follower follows said cam race when said cam follower revolves around said first shaft, said radial displacement varying as said cam follower follows said cam race.

7. The device as recited in claim 4, wherein said means for sliding said connector with respect to said rotor further comprises:

a holder having a cam race formed therein;

a cam follower carried by said connector and engaging said holder so that said cam follower follows said cam race when said cam follower revolves around said first shaft, said radial displacement varying as said cam follower follows said cam race.

8. The device as recited in claim 4, wherein said means for sliding said connector with respect to said rotor further comprises:

a holder having a cam race formed therein;

a roller in said cam race;

a cam follower carried by said connector and engaging said roller so that said cam follower follows said cam race when said cam follower revolves around said first shaft, said radial displacement varying as said cam follower follows said cam race.

9. The device as recited in claim 4, further comprising means for rotating said first shaft.

10. A device for broaching a workpiece, said device comprising:

a first shaft having a first axis of rotation;

a second shaft having a second axis of rotation;

a cutter bit carried by said second shaft;

means for coupling said first shaft to said second shaft so that, when said first shaft rotates with respect to said workpiece, said second shaft and said cutter bit rotate with respect to said workpiece; and means for varying a displacement of said second shaft with respect to said first shaft as said first shaft rotates with respect to said workpiece so that said cutter bit broaches said workpiece when said cutter bit is brought into engagement with said workpiece, and wherein said means for varying a displacement of said second shaft with respect to said first shaft comprises a holder, wherein said holder comprises an inner annular member, and an outer annular member which is a coaxial with said inner annular member, and an annular cam race void is formed between said inner annular member and said outer annular member.

11. The device as recited in claim 10, wherein said means for varying a displacement of said second shaft with respect to said first shaft further comprises a connector slidably carried within said means for coupling said first shaft to said second shaft, and said connector slides within said means for coupling said first shaft to said second shaft in a direction which is generally perpendicular to the axis of rotation of said second shaft.

12. The device as recited in claim 10, wherein said means for coupling said first shaft to said second shaft has a groove formed therein, and wherein said means for varying a displacement of said second shaft with respect to said first shaft further comprises a connector slidably carried within said groove, wherein said connector is not attached to said means for coupling said first shaft to said second shaft, and said connector slides within said groove in a direction which is generally perpendicular to the axis of rotation of said second shaft.

13. The device as recited in claim 10, wherein said means for coupling said first shaft to said second shaft is a rotor attached to said first shaft and rotatable therewith, said second shaft being in operational connection with said rotor, and wherein said means for varying a displacement of said second shaft with respect to said first shaft further comprises:

a connector carried by said rotor, said connector rotatable with said rotor and said first shaft; and a cam follower extending from said connector and rotating with said connector, said cam follower engaging said holder so that said cam follower extends into said annular cam race void and follows said annular cam race void when said second shaft revolves around said first axis.

14. The device as recited in claim 10, wherein said coupling means is a rotor attached to said first shaft and rotatable therewith, said second shaft being in operational connection with said rotor, and wherein said means for varying a displacement of said second shaft with respect to said first shaft further comprises:

a cam follower engaging said holder so that said cam follower follows said annular cam race void when said second shaft revolves around said first axis; and a connector slidably carried by said rotor and attached to said cam follower so that, when said connector slides with respect to said rotor, said cam follower slides with respect to said rotor, said cam follower being thereby radially displaceable with respect to said first axis as said cam follower rotates with said connector and said rotor.

15. The device as recited in claim 10, wherein said coupling means is a rotor attached to said first shaft and rotatable therewith, and wherein said means for varying a displacement of said second shaft with respect to said first shaft comprises:

a cam follower extending into and engaging said annular cam race void of said holder so that said cam follower revolves around said first shaft; and a connector slidably carried by said rotor and attached to said cam follower so that, when said connector slides with respect to said rotor, said cam follower slides with respect to said rotor, said cam follower being thereby radially displaceable as it follows said cam race and rotates with said connector and said rotor, said second shaft being attached to said connector and rotatable therewith;

and wherein said holder further comprises a through hole formed in said holder through said inner annular member, said first shaft running through said through hole and rotatable with respect to said holder.

16. A device for broaching a workpiece, said device comprising:

a holder having a hole formed therein and a cam race formed about said hole;

a shaft running through said hole and rotating with respect to said holder thereby defining an axis of rotation;

a cam follower engaging said holder and following said cam race, said cam follower rotating with respect to said holder and being radially displaceable with respect to said axis of rotation, by said cam race;

first means for connecting said cam follower to said shaft so that, as said cam follower follows said cam race, said cam follower can rotate with respect to said holder and be stationary with respect to said shaft but be axially displaceable with respect to the axis of rotation;

a cutter bit for broaching said workpiece; and second means for connecting said cam follower to said cutter bit so that said cutter bit is stationary with respect to said shaft and rotates with respect to said holder but is radially displaceable by said cam follower as said cam follower follows said cam race.

* * * * *